United States Patent [19]

Gawin et al.

[11] Patent Number: 5,025,045
[45] Date of Patent: Jun. 18, 1991

[54] DAMAGE TOLERANT COMPOSITES CONTAINING INFUSIBLE PARTICLES

[75] Inventors: Irena Gawin, Sandy, Utah; Brian J. Swetlin, Wilmington, Del.

[73] Assignee: Hercules Incorporated, Wilmington, Del.

[21] Appl. No.: 286,840

[22] Filed: Dec. 20, 1988

Related U.S. Application Data

[62] Division of Ser. No. 137,846, Dec. 24, 1987, abandoned.

[51] Int. Cl.$^5$ .............................................. C08L 63/00
[52] U.S. Cl. ..................... 523/440; 525/109; 525/113; 525/119; 525/122; 523/400
[58] Field of Search ............... 525/109, 113, 119, 122; 524/435; 523/440, 400

[56] References Cited

U.S. PATENT DOCUMENTS

| | | | |
|---|---|---|---|
| 3,837,904 | 9/1974 | Hill | 117/139.5 A |
| 3,926,903 | 12/1975 | Scola | 260/42.28 |
| 3,926,904 | 12/1975 | Scola | 260/42.28 |
| 4,187,347 | 2/1980 | Brook | 428/375 |
| 4,195,113 | 3/1980 | Brook | 428/375 |
| 4,220,686 | 9/1980 | Brook | 428/375 |
| 4,222,918 | 9/1980 | Zentner et al. | 360/29.2 |
| 4,264,655 | 4/1981 | Brook | 427/381 |
| 4,539,253 | 9/1985 | Hirschbuehler et al. | 428/229 |
| 4,608,401 | 8/1986 | Martin | 523/205 |
| 4,656,207 | 4/1987 | Jabloner et al. | 523/400 |
| 4,663,401 | 5/1987 | Saito et al. | 525/505 |
| 4,680,076 | 7/1987 | Bard | 523/435 |
| 4,783,506 | 11/1988 | Gawin | 525/109 |

OTHER PUBLICATIONS

"Development of Resins for Damage Tolerant Composites—A Systematic Approach", by Joram Diamant and Richard J. Moultan, 29th National SAMPE Symposium, Apr. 3-5, 1984.

*Primary Examiner*—Lewis T. Jacobs
*Attorney, Agent, or Firm*—Edmund C. Ross; Mark Goldberg

[57] ABSTRACT

Damage tolerant composites comprising high strength filaments in the form of bundles or tows of continuous fiber and a tough phase separated, crosslinked epoxy resin matrix are disclosed. The crosslinked epoxy resin matrix comprises infusible particles that reside primarily between plies of the composite and critically have a median particle size between 10-75 microns. Prepregs for making the damage tolerant composites and methods of making such prepregs and the epoxy resin compositions thereof are also disclosed. The epoxy resin compositions comprise the infusible particles which become segregated as to size on a surface layer of the prepreg during the process of combining the high strength filaments of the prepreg and the resin containing the epoxy resin composition. Alternatively, the infusible particles may be disposed directly on the epoxy resin surface of the prepreg.

5 Claims, 6 Drawing Sheets

DAMAGE TOLERANT COMPOSITES CONTAINING INFUSIBLE PARTICLES

This application is a division of application Ser. No. 07/137,845, filed Dec. 24, 1982, now abandoned.

This invention relates to damage tolerant structural composites comprising high strength filaments in a crosslinked epoxy resin matrix. This invention, more particularly, relates to improvements in the crosslinked epoxy resin matrix (and methods of achieving such improvements) which provide the structural composites with high post impact compressive strength while maintaining such other desirable attributes of epoxy composites as good high temperature performance and processing characteristics.

Composites comprising high strength filaments in a resin matrix are well known materials; they are being proposed for use in more and more weight sensitive applications such as aircraft structural components. Recently, there has been keen interest in increasing the "damage tolerance" of these composites. A criteria used for quantifying the "damage tolerance" is the measured compressive strength exhibited by the composite, layed-up in certain fashion, after it has received an impact typically in the range of 1,500 inch—pounds per inch thickness of the composite, such criteria referred to herein as post impact compression or post impact compressive strength (both abbreviated as PIC) or residual compressive strength after impact (abbreviated as CAI).

Thermoplastics have been proposed as matrix materials to increase damage tolerance of composites. Thermoplastics are extremely tough materials when they are free of fiber or other solid additives, i.e. as neat resins. Thermoplastics, however, require high processing temperatures in providing prepregs (comprised filaments and the resin) and forming the prepregs into composites.

Epoxy resins, on the other hand, are thermosetting resins and may be processed into prepregs at low temperatures. In addition, composites made using epoxy resins traditionally have exhibited good high temperature properties. However, the damage tolerance of composites having a crosslinked epoxy resin matrix has been generally much less than that of the better thermoplastic materials.

One approach proposed for increasing the damage tolerance of composites made from epoxy resins has focused on increasing the toughness of the cured epoxy resin used as the matrix material in the composites. Inclusion of polysulfones to lower cross-link density have been suggested for this purpose. (See, for example, EPO 0130270, Union Carbide; EPO 0761576, Sumitomo Chemical Company; and U.S. Pat. Nos.4,656,207 and 4,656,208, both in the names of Chu, Jabloner and Swetlin.) Another recent effort along these lines is illustrated by the Diamant and Moultan paper entitled "Development of Resins For Damage Tolerant Composites—A Systematic Approach", Pages 422-436, 29th National Sampe Symposium, Apr. 3-5, 1984. Certain rubber polymers are shown in this paper to enhance toughness of cured epoxy resins. The rubber polymer in the cured epoxy resins discussed by Diamant and Moultan is said to be dispersed in particles 0.5-1 microns in size, independent of the molecular weight of the polymer. Included among the rubber polymers examined by Diamant and Moultan for use in epoxy composites are butadiene acrylonitrile rubbers having carboxy functionality, e.g. Hycar 1472.

Use of rubber polymers in epoxy resin composites is also shown in the following U.S. Pat. Nos.: 3,837,904; 3,926,903 and 3,926,904. The use of polysulfone resins in combination with rubber polymers has been disclosed in the following U.S. Pat. Nos.: 4,187,347; 4,195,113; 4,220,686; 4,222,918 and 4,264,655.

Still another approach in making damage tolerant composites is described in U.S. Pat. No. 4,539,253. The approach in this patent is to make a "discrete, integral resin interleaf layer" of an epoxy resin comprising a "rubbery vinyl addition polymer." The interleaf layer is supported by a fibrous mat or carrier and is introduced between layers (plies) of high strength filament that comprise a different epoxy resin.

Although progress has been achieved in increasing the damage tolerance of epoxy resin composites made using conventional processing temperatures and techniques, damage tolerant composites with good high temperature performance damage and processing characteristics have not been heretofore available.

It is an object of this invention to provide improvements in the damage tolerance of composites comprising high strength filaments in a crosslinked epoxy resin matrix, such composites also having good high temperature performance and processing characteristics.

It is an object of this invention to provide a prepreg comprising high strength filaments and a crosslinkable epoxy resin composition wherein the prepreg cures into a damage tolerant composite.

It is an object of this invention to provide an epoxy resin composition which may be used in making damage tolerant composites.

It is an object of this invention to provide a method of manufacturing epoxy resin compositions which may be used in making damage tolerant composites.

These and other objects have been accomplished in practice of this invention which is described in the following disclosure.

This invention relates to the discovery that composites comprising high strength filaments and a tough, phase separated, crosslinked epoxy resin matrix are made exceptionally damage tolerant when infusible particles having a median particle size in excess of ten microns are incorporated as part of the epoxy resin composition used in forming the composite. The composition of the infusible particles preferably comprises a rubber polymer but other materials such as glass and ceramic are also useful as the infusible particles above or together with other such particulate.

The epoxy resin compositions used in making the damage tolerant composites comprise a polyepoxide component, a reactive aromatic oligomer component, a curing agent and a component that either becomes incorporated in the infusible particles (preferably during manufacture of the resin) or otherwise constitutes the predominant material of infusible particles. The epoxy resin composition may be in the form of a film for impregnating bands of high strength filaments, a mass of material that can be rendered molten by heat and spread on bands of high strength filaments or a dissolution product that can impregnate high strength filaments in dipping operations. The epoxy resin compositions, when cured in neat form, have a $K_{1c}$ (critical stress intensity factor) greater than 1 MPa$\sqrt{m}$.

The polyepoxide component comprises an epoxide compound having a glass transition temperature preferably between $-100°$ and $20°$ C. and can assist in providing tack to the prepregs made with the resin composition. The polyepoxide component contains on average more than one epoxide group per molecule and preferably at least 2 epoxide groups per molecule. The term epoxide group as used herein refers to the simplest epoxide group which is the three-membered ring, The terms of α-epoxy (or epoxide), 1,2-epoxy (or epoxide), vicinal epoxy (or epoxide) and oxirane group are also art recognized terms for this epoxide group.

Polyepoxide compounds having between 2 and about 4 epoxide groups per molecule and a glass transition temperature below 5° C. are particularly preferred. Suitable aromatic polyepoxide compounds are resorcinol diglycidyl ether (or 1,3-bis-(2,3- epoxypropoxy)benzene) marketed, for example, by Wilmington Chemical as HELOXY ® 69; diglycidyl ether of bisphenol A (or 2,2-bis[p-(2,3-epoxypropoxy)phenyl]propane); triglycidyl p-aminophenol (or 4-(2,3-epoxypropoxy)-N,N-bis(2,3-epoxpropyl)aniline); diglycidyl ether of bromobisphenol A (or 2,2-bis[4-(2,3-epoxypropoxy)3-bromophenyl]propane; diglycidylether of bisphenol F (or 2,2-bis[p-(2,3-epoxypropoxy)phenyl]methane); triglycidyl ether of meta-aminophenol (or 3-(2,3-epoxypropoxy) N,N-bis(2,3-epoxypropyl)aniline); tetraglycidyl methylene dianiline (or N,N,N',N'-tetra(2,3-epoxypropyl) 4,4'diaminodiphenyl methane), polyglycidyl ethers of phenol-formaldehyde novalcs (e.g. DEN 431,438 of Dow Chemical Company); and polyglycidyl ether of orthocresol-novalac (available from Ciba Geigy or, for example, ECN 1235 or 1273). Combinations of two or more polyepoxide compounds can be used as the polyepoxide component. Preferred combinations include mixtures of diepoxides comprising diglycidyl ether of bisphenol F, resorcinol diglycidyl ether and the triglycidylaminophenols or tetraglycidyl methylene dianiline, and mixtures of the triglycidylaminophenols and the diglycidyl ether of butanediol (or 1,4-bis[2,3-epoxypropoxy]-butane) or the diglycidyl ethers of polypropylene glycol, particularly tri- or tetra-(α-propylene glycol) di-(2,3-epoxypropyl) ether. Particularly preferred are polyepoxide components which comprise aromatic polyepoxide compounds and up to about 50% of one or more aromatic or aliphatic diepoxide compounds, and which have glass transition temperatures between about −100° C. and about 20° C.

The reactive aromatic oligomer contains functional groups which are reactive with the polyepoxide component and/or the amine hardener of the composition. In one preferred embodiment the oligomer is epoxy-reactive (i.e. reacts with epoxide groups) and has at least 1.4 epoxy-reactive groups per molecule. In another embodiment the oligomer is epoxy-functional, i.e. it contains epoxide groups. The reactive aromatic oligomer preferably contains divalent aromatic groups such as phenylene, diphenylene or naphthalene groups linked by the same or different divalent non-aromatic linking groups. Exemplary linking groups are oxy(—O—); sulfonyl(—SO₂—); divalent sulfur (—S—); oxyalkylene or oxyalkyleneoxy(—OR— or —ORO— wherein R is lower alkylene preferably with 1-3 carbon atoms); lower alkylene or alkylidene (—R— or —R(R₁)ᵧ wherein R and R₁ are independently lower alkylene and y is 1 or 2); ester groups such as —(R₁) ₓCOO(R₂)ᵧ— wherein R₁ and R₂ are independently lower alkylene preferably with 1 to 3 carbons and x and y are independently zero or 1; and oxaalkylene, i.e.

where R₁ and R₂ are independently lower alkylene or a valence bond. The aromatic units can be substituted with non-interfering substituents such as chlorine, lower alkyl, phenyl etc. Generally, at least twenty-five percent of the total number of carbon atoms in the reactive aromatic oligomer will be in aromatic structures, and preferably at least about 50% of the total carbon atoms are in aromatic structures.

The preferred reactive aromatic oligomers are preferably polyethers, polysulfones, polyethersulfones, polyethersulfonepolythioethersulfones and more preferably contain sulfone bridged diphenylene units or ketone bridged diphenylene units. Other types of units which can be present in these preferred oligomers are aromatic or cycloaliphatic units that are not bridged (e.g., naphthalene) or are bridged by groups which are essentially nonpolar, examples of which are alkylidene such as isopropylidene bridges. Particularly preferred reactive oligomers contain sulfone bridge diphenylene units and bisphenol units, a portion of the latter units optionally being replaced by divalent sulfur (—S—) to provide a reactive oligomer of the formula:

NH₂R"—O—(R—R')ₘ—(R—S)ₙ—R—O—R"NH₂     I wherein R" is 3,4-phenylene or 4,4'phenylene; R is the residuum of a dihalodiphenylsulfone such as 4,4 'dichlorores diphenylsulfone or a dihalogendiphenyl ketone, R' is the residuum of a dihydroxy or dithiol aromatic compound such as bisphenol A, dihydroxy benzene biphenol and quinoline. O is divalent oxygen, S is divalent sulfur and m plus n averages between 8 and 25 and m is preferably at least 2.

The reactive aromatic oligomers preferably have reactive groups that are terminal groups on the oligomer backbone and more preferably are reactive groups at the ends of oligomeric backbones which have little or no branching. The preferred reactive groups of the reactive aromatic oligomer are primary amine(—NH₂), hydroxyl(—OH), carboxyl(—COOA where A is hydrogen or an alkali metal), anhydride, thiol, secondary amine and epoxide groups. Especially preferred are reactive aromatic oligomers having at least about 1.7 reactive groups per molecule and having at least about 70% of the total number of reactive groups present as primary amine, secondary amine, hydroxyl and/or epoxide groups.

The preferred reactive aromatic oligomers are made, for example, by reacting a molar excess of a sulfone such as dichlorodiphenylsulfone with a dihydroxy aromatic compound or compounds such as bisphenol A or 2,7 naphthalenediol so as to yield a chloro-terminated oligomer and then reacting this chloro-terminated oligomer with an alkali metal salt of a hydroxy amine compound such as para or meta aminophenol to provide the reactive groups on the ends of the oligomer. Suitable sulfones for this procedure are meta, and para dichlorodiphenylsulfones. Among the suitable dihydroxy aromatic compounds for use in this procedure are bisphenol A, bisphenol F, naphthalenediols and biphenyl diols. More detailed procedural steps appear in U.S. Ser. No. 823,912 filed Jan. 30, 1986 which is herein incorporated by reference. Other procedures for producing oligomers having reactive end groups are disclosed in U.S. Pat. Nos. 3,895,064 to Brode and Kawakami and 3,563,951 to Radlman and Nischk, the latter patent using a procedure which involves forming nitro terminated oligomers and then reducing the nitro groups to amines.

An advantageous route for making the preferred amine terminated aromatic oligomers comprises: (a) dehydrating a dihydroxy aromatic compound or a combination of dihydroxy compounds with an amount of alkali metal hydroxide that provides slightly less than one equivalent of alkali metal for each equivalent of hydroxyl in the dihydroxy compound or combination thereof, the dehydration being in the presence of an organic liquid and an alkali metal carbonate in an amount which is at least equivalent to the hydroxyl excess; (b) reacting a molar excess of dihalogen diphenylsulfone bearing about two replacable halogens per molecule with the dehydrated product of (a) in the presence of an organic solvent and an alkali metal carbonate; (c) dehydrating a phenol bearing epoxy-reactive functionality such as p-aminophenol, m-aminophenol or combinations thereof with alkali metal hydroxide in an amount that provides slightly less than one alkali metal equivalent for each hydroxy equivalent in the aminophenol and an amount of an alkali metal carbonate at least equal to the deficiency of alkali metal hydroxide; and (d) reacting the dehydrated products of (c) with the condensed product of (b). Amine terminated polysulfone oligomers made in this manner have at least about 70% of the end groups amine terminated and contain little or no organic chlorine substituents. Epoxide terminated aromatic oligomers can be prepared by the same route by reacting the condensed product of (d) with an amount of a polyepoxide compound sufficient to provide at least one epoxide per equivalent of active hydrogen of (b) or (d). Preferably an excess of epoxide groups will be present and more preferably the epoxide : hydrogen equivalence ratio will be between about 5:1 and about 30:1. Generally the temperature of the reaction mixture will be maintained at about 50° C. or above to ensure reaction in a reasonable period of time. The preferred temperature range is about 80° to 150° C. Epoxide terminated polysulfone oligomers made in this manner can contain up to 12 epoxide groups depending upon the epoxide functionality of the polyepoxide compound.

The glass transition temperature of the reactive aromatic oligomer preferably ranges between 150° and 250° C. A more preferred range is between 160° and 190° C. The molecular weight (number average) of the reactive aromatic oligomer preferably ranges between 2500 and 5000. Preferably, the reactive aromatic oligomer has a polydispersity ($M_w/M_n$) of between about 2.0 and 4.0 where $M_n$ is number average molecular weight and $M_w$ is weight average molecular weight.

The curing agent of the preferred epoxy resin compositions is preferably an amine hardener, more preferably an aromatic diamine having a molecular weight below 750 and still more preferably is a compound of the formula wherein $R_1$, $R_2$, $R_3$ and $R_4$ are independently hydrogen, halogen or an alkyl or alkoxy group with 1 to 12 carbon atoms and X is O, S, $SO_2$, alkylene, alkylidene, and oxoalkylene and m is 0 or 1, a phenylene diamine or a heterocyclic diamine. A particularly preferred aromatic diamine is 3,3'diaminodiphenylsulfone. Other aromatic diamines include a diaminodiphenyl sulfide; a methylenedianiline such as 4,4'-methylene-dianiline; a diaminodiphenylether; a diaminobenzophenone; benzidine; 4,4'thiodianiline; 4-methoxy-6-m-phenylenediamine; 2,6-diaminopyridine; 2,4-toluenediamine; and dianisidine. Still other aromatic diamines such as the di(aminophenoxy)diphenyl ethers or sulfones can be employed if desired. Alicyclic amines such as menthane diamine may also be employed. In some cases aliphatic amines such as secondary alkylamines which are normally fast reacting hardeners can be used alone or in combination with other amine hardeners provided the concentration and/or curing temperature are sufficiently low to permit control of the curing rate. Other fast reacting hardeners which can be employed for making the epoxy resins of the invention are dicyandiamide, boron trifluoride/amine complexes and the like.

The hardener is present in the composition in an amount sufficient to crosslink or cure the composition and preferably is present in an amount which provides (together with the reactive aromatic oligomer) from 0.6 to 1.5 equivalents and more preferably from 0.8 to 1.2 equivalents of active hydrogen atoms per one equivalent of epoxide groups in the composition.

The epoxy resin compositions hereof in preferred embodiments contain a rubber polymer. The rubber polymer is insoluble in the polyepoxide compounds used in making the epoxy resin compositions. An amount of this polymer is contained in infusible particles that are dispersed throughout the epoxy resin composition. The rubber polymer preferably is crosslinkable having functionality such as carboxyl groups. Carboxy functional butadiene acrylonitrile polymers are preferred. An example of this latter polymer is Hycar 1472 marketed by B. F. Goodrich. A description of carboxy functional rubber polymers appears in the article "Crosslinking Reactions of Carboxylic Elastomers" by Harold P. Brown in Rubber Chemistry and Technology 36(4), 931-62 (1963). A catalyst is preferably employed with carboxy or other functional polymer. An example of such a catalyst is an aryl phosphonium halide catalyst such as ethyltriphenylphosphonium iodide available from Morton-Thiokol.

In other embodiments, the infusible particle comprises glass, ceramic, ground rubber particles or other such inert organic and inorganic particles which do not crosslink in the epoxy matrix. In these embodiments of this invention, glass beads or the like, ground rubber or ceramic are dispersed in the epoxy resin composition during or after its formation and may be surface treated to enhance adhesion in the crosslinked epoxy resin matrix. The rubber particles comprise natural or synthetic rubber and may be ground cryogenically to desired particle sizes.

The infusible particles have a median particle size (i.e. half are bigger and half are smaller) ranging between 10 and 75 microns. The particles may be evenly distributed in the epoxy resin composition but are segregated according to size during prepreg manufacture, discussed below. As an alternative the particles may be dispensed directly on the prepreg during its manufacture.

The infusible particles may take a variety of shapes including cylindrical, mostly round and spherical. The particles are infusible insofar as they resist deformation and agglomeration during manufacture of the epoxy resin composition and prepregs thereof. The infusible particles also preferably have a lower modulus than the remainder of the crosslinked epoxy resin matrix.

A preferred route in making epoxy resin compositions of this invention which contain particles comprising a rubber polymer involves forming the infusible particles in situ. By "in situ" is meant forming the particles during manufacture of the epoxy resin composition. The particles formed in this manner are stable and resist deformation, agglomeration and solubilization during manufacture of the epoxy resin composition.

Manufacture of the epoxy resin compositions using the preferred in situ process comprises admixing a portion e.g., between 40 and 60% by weight of the polyepoxide component, together with the reactive oligomer component at elevated temperature, e.g., between 30° and 90° C., to dissolve the oligomer component in the epoxy compounds. A crosslinkable rubber polymer preferably in the form of a solution which has between about 10 and 20% of the polymer and between 90 and 80% of low boiling solvent is added. The solvent is then distilled under vacuum to provide a resin premix having less than 5% by weight solvent, more preferably 3% or less solvent. Then the catalyst and other ingredients such as antioxidant are added. Mixing continues at this temperature permitting continued reaction of the crosslinkable rubber polymer in completing the formation of the infusible particles. Alternatively, a crosslinkable rubber polymer may be dissolved in a portion of the polyepoxide component using a low-boiling solvent, the solvent driven off, and the polyepoxide compound(s) containing the dissolved rubber polymer added at elevated temperature to a mixture of the amine terminated polyarylene polyether sulfone and another portion of the polyepoxide component. The catalyst is added permitting an accelerated completion of the reaction forming the infusible particles, as desired.

In still another procedure, the polyepoxide component and the oligomer component are mixed in a sealed mixer and then the rubber polymer, dissolved in solvent, is added together with or followed by addition of the catalyst and antioxidant as desired. The sealed mixer is maintained at elevated temperature causing the infusible particles of appropriate size to form. The resulting epoxy resin composition may be used to form prepregs using a bath that is agitated to keep the infusible particles dispersed during impregnation of fiber passing through the bath.

The curing agent of the epoxy resin composition is preferably added after formation or addition of the infusible particles. Dispersion of the curing agent in the intermediate epoxy resin composition may be accomplished without deformation of the infusible particles.

Table A below provides the general and preferred ranges, as parts by weight, for the polyepoxide polymer component, reactive aromatic oligomer, hardener and infusible particles present in the thermosetting epoxy resin compositions of this invention:

TABLE A

|  | General | More Preferred |
|---|---|---|
| Polyepoxide Component | 100 | 100 |
| Reactive Oligomer | 10 to 200 | 20 to 60 |
| Hardener (curing agent) | 15 to 100 | 20 to 60 |
| Infusible Particles[a] | 1 to 15[b] | 4 to 12[b] |

[a]E.g. carboxy functional rubber polymer.
[b]By weight, per hundred parts of the epoxy resin composition.

Other ingredients such as catalyst, antioxidant, processing aids and the like are included in the epoxy resin compositions in minor amounts.

The preferred cured, i.e., crosslinked resins produced from the compositions of this invention have a multi-phase morphology comprising glassy phases and a phase i.e. the infusible particle phase, that is distributed in certain fashion within the thermoset composite. The domains of the dispersed discontinuous glassy phase preferably are between about 0.05 and 10 microns and more preferably between 0.1 and 5 microns in largest dimension. The domains are generally spherical or ellipsoidal in shape but may take other shapes particularly around the filaments in the matrix. The particles containing rubber polymer are dispersed in the glassy phases and have a size and distribution as previously discussed. The particles containing the rubber polymer are preferably of lower modulus than the remainder of the crosslinked epoxy resin matrix comprising the glassy phases.

The volume of the discontinuous glassy phases preferably constitutes at least about 15%, more usually between 30% and 65% of the total volume of the cured resin. The total volume of the cured resin (Vr) is defined as the volume of the continuous phase(s) (Vc) and the volume of the discontinuous phase(s) (Vd) combined. In determining the volume of the discontinuous phase(s), a micrograph of a microtomed section of the cured resin or composite is made and the area (or an area fraction) of the micrograph occupied by the continuous phase(s) (Ac), discontinuous phase(s) (Ad) and filament or fiber (Af) may be determined visually or instrumentally, using commercial devices such as a digitizer or image analyzer. In certain composites of this invention, the disperse phase may be continuous in certain portions of the composite and vice-versa. The amine functional polyarylene polyether sulfone may exist in either of the glassy phases and has been shown in certain instances as residing as well in the infusible particles that comprise a crosslinkable rubber.

The prepregs of this invention are made by combining the epoxy resin compositions and high strength filaments using conventional techniques. For example, the epoxy resin composition can be made into a film on a sheet of release paper in a film process. Film carried by upper and lower release papers are pressed into bands or sheets of high strength filaments in making prepreg by this process. Alternatively, a "hot bead" process may be used wherein the epoxy resin composition is rendered molten and pressed into the bands or sheets of high strength filaments. Still another route is by dispersing the epoxy resin composition in solvent, passing the high strength filaments through a bath containing the solvent and then driving off the solvent to provide the prepreg. In this latter technique, the bath is advantageously agitated to keep the infusible particles dispersed therein.

In all of the aforementioned techniques of making prepreg, the large infusible particles are trapped by the filament tows or bundles thereby providing in a prepreg that has these particles on its surface rather than between filaments in the bundle or tows of filaments. The prepregs may be simply layed on one another in making the damage tolerant components of this invention.

FIG. 1 shows a photomicrograph of a damage tolerant composite of the invention. The carbon fiber appears as white streaks (0°, i.e. parallel to the horizontal axis of the micrograph), white ovals (+/− 45°, i.e. diagonal to the horizontal axis of the micrograph) and white circles (90°, i.e. perpendicular to the plane of the micrograph). The crosslinked epoxy resin matrix appears grayish in the micrograph with the particles comprising rubber polymer generally being circular black dots. The damage tolerant composite exhibited a 52.2 Ksi (thousand of pounds per square inch) post impact compressive strength (PIC) at an impact of 1500 inch pounds per inch thickness using the lay-up described in the Examples. (All PIC values of the composites in the drawings were determined at 1500 inch pounds per inch thickness using the procedures of the Examples.)

This invention has particular applicability to damage tolerant composites which are made from materials commonly referred to as "prepregs." Prepregs comprise resin and high strength filaments which are in the form of filamentary bundles (often called "rovings" or "tows") comprising a multitude of the filaments. Each tow of carbon fiber, for example, typically bundles between about 500 and 20,000 filaments. A plurality of filamentary bundles are aligned or woven together in making a prepreg in sheet form, a preferred form according to this invention. Alternately, the prepreg may be in the form of a single bundle of filaments impregnated with resin. This later prepreg form finds use in processes such as filament winding and pultrusion.

The preferred high strength filaments are carbon fiber filaments made, for example, by carbonizing polyacrylonitrile, rayon or pitch. (Carbon fiber is also called "graphite fiber" by some and the terms "carbon fiber" and "graphite fiber" are interchangeable as used herein.) Examples of preferred high strength filaments are AS-4, IM-6 and IM-7 carbon fiber marketed by Hercules Incorporated. Other high strength filaments preferably having a diameter between 3 and 9 microns can also be employed.

The prepregs hereof comprise epoxy resin composition that permit the prepreg to cure into damage tolerant composites. The epoxy resin compositions when cured without any high strength filaments have a $K_{10}$ of greater than 1 MPa m. This high degree of toughness, coupled with the action of the infusible particles provides composites that include the infusible particles and high strength filaments with post impact compression values in excess of 45,000 psi at 1,500 inch pounds per inch thickness of the composite.

FIGS. 1-5 are copies of photomicrographs of sections taken of damage tolerant composites of this invention. As can be seen in viewing these Figures, the distribution of infusible particles (black or darker dots) is such that the larger particles generally reside between the fiber plies whereas the smaller particles tend to be trapped between filaments within the plies. A comparison of the photomicrographs of FIGS. 5 (a composite having a measured post impact compression strength (PIC) of 38) with the photomicrographs of FIGS. 1 and 2(a) and (b) (composites having a measured post impact compressive strength of 52.2 and 54 respectively) shows a relationship between the size of infusible particles in the matrix and high PIC values of the damage tolerant composites.

The damage tolerant composites of FIGS. 1-5 are made using epoxy resin compositions all having the same nominal formulation. The composites having the higher post impact compression values are made from epoxy resin compositions having infusible particles with a higher median particle size; and such larger particles can be seen as generally residing in that portion of the crosslinked epoxy resin matrix between the plies of filaments.

The epoxy resin compositions used in making the composites illustrated in FIGS. 1-5 comprise infusible particles of similar size and shape as appear in FIGS. 1-5. Compare, for example, the infusible particles in the neat resin of FIGS. 2(c) and 2(d) with the infusible particles of the damage tolerant composites in FIGS. 2(a) and 2(b). A number of these particles, preferably more than half, have a dimension that is greater than 10 microns. Composites with highest damage tolerability as measured in post impact compression tests generally comprise infusible particles having a mean dimension at least about 15 microns. More preferably, the median particle size of the infusible particles is between about 25 and 75 microns.

The following Examples illustrate practice of this invention and are not intended as a limitation thereof. All parts and percentages in the Examples are parts and percentages by weight and all temperatures are in degrees centigrade unless otherwise noted.

EXAMPLE 1

The formulation in Table 1 set forth below was used in preparing prepreg made of an epoxy resin composition and tows of carbon fibers using procedures described hereinafter.

TABLE 1

| Ingredient | Parts by Weight |
|---|---|
| Diglycidyl Ether of Bisphenol-F[1] | 13.12 |
| Triglycidyl p-amino phenol[2] | 13.12 |
| Amine functional polyarylene polyether sulfone[3] | 13.65 |

TABLE 1-continued

| Ingredient | Parts by Weight |
|---|---|
| 3,3'-Bis(aminophenyl)sulfone[4] | 12.86 |
| Carboxy-functional butadiene acrylonitrile polymer[5] | 2.09 |
| Ethyltriphenylphosphonium iodide[6] | 0.0368 |
| Polymerized 1,2-dihydro-2,2,4-trimethyl quinoline[7] | 0.1052 |

[1] Epiclon 830, a product of Dainippon Ink and Chemicals, Inc. having an epoxy equivalent of about 180, viscosity of about 3000 cps (at 25° C.) and specific gravity of about 1.18 (at 25° C.).
[2] MY 0510, a product of Ciba Geigy, said to be a reaction product of three molar parts of epichlorohydrin and one molar part of p-aminophenol, and have an epoxy equivalent of about 99.
[3] A product made by reacting a molar excess of dichlorodiphenylsulfone with the potassium double salt of Bisphenol-A followed by reaction with the potassium salt of aminophenol. Product has molecular weight (number average) between about 3500 and 5500 and between about 85–95% of the end groups are amine groups with the remainder of the end groups comprising hydroxyl groups. Procedures for making this polyether sulfone are described in detail in the examples of USSN 823,912 filed on January 30, 1986 in the name of Jabloner and Nguyen which are hereby incorporated herein by reference.
[4] Air milled from Sumitomo Chemical, Alva Chemical or Aceto Chemical companies.
[5] Hycar 1472, a product of B. F. Goodrich, said to be nitrile rubber made from butadiene and acrylonitrile, in the form of a rubber crumb.
[6] Catalyst sold by Morton-Thiokol.
[7] Agerite Resin D sold by R. T. Vanderbilt, antioxidant.

The carboxy-functional butadiene acrylonitrile polymer in the form of a crumb is added to methylethylketone at a weight ratio of 15 parts crumb to eighty five parts methylethylketone. The mixture is stirred to form a homogeneous solution which is called "Rubber Solution" in this Example.

A Meyer's vacuum mixer having a five gallon capacity is used in the preparation of the epoxy resin composition. The mixer is equipped with a thermometer and fast and slow mixing blades; it is heated by oil circulation and can be evacuated by a vacuum pump using a solvent trap.

The vacuum mixer is cleaned with solvent and then first set to have a temperature between 60° C. and 100° C. to drive off the cleaning solvent. The triglycidyl p-aminophenol epoxy resin (13.12 parts) and diglycidyl ether of Bisphenol F epoxy resin (2.62 parts) are added together and mixed in the vacuum mixer while heated to about 60° C. To these preheated, mixed epoxy resins is added the amine functional polyarylene polyether sulfone (13.65 parts) in particulate form. Methylethylketone (6.658 parts) is used to wash the polysulfone ether powder from the sides of the mixer during the mixing operation. The lid on the mixer is then closed and the temperature of the mixture increased to about 60° C. The high speed mixer blades are set at about 1400 RPM. After the temperature of about 60° C. is reached and the amine functional polyarylene polyether sulfone is dissolved, the mixer is opened and the Rubber Solution (13.91 parts) added. The mixer is closed and the temperature set for about 120° C. The mixer blades are set at low speed and mixing continued until the reflux temperature (80°) is reached. The vacuum pump is then started. The vacuum in the mixer is maintained at a level no higher than 13–15 centimeters Hg up to a temperature of 85° C. (Should the resin foam up, the vacuum is released slowly until foaming decreases to a position below the top of the mixing blades at a pressure of about 13 centimeters Hg.)

Table 2, set forth below, shows the relationship between temperature and maximum vacuum that can be employed in heating the resin mixture:

TABLE 2

| Resin Temperature (°C.) | Vacuum (cm) |
|---|---|
| Up to 85 | 13–15 |
| 85 | 22.9 |
| 88 | 30.5 |
| 91 | 35.5 |
| 93.5 | 45.7 |
| 102 +/− 3 | 50.8 |

When the temperature of the resin mixture reaches 102° +/− 3° C, the vacuum is released and the ethyltriphenyl phosphonium radical catalyst (0.0368 parts) and polymerized 1,2-dihydro-2,2,4 trimethyl quinoline antioxidant (0.1052 parts) are added to the mixer.

With the mixer closed, mixing is continued at low speeds for about 50 minutes at 105° +/− 3° C. After the mixing has continued for 5 minutes, vacuum is applied and maintained at about 51–52 centimeters Hg for 30 minutes. After this 30 minute period, a full vacuum is applied for the remainder of the 50 +/− 5 minute mixing period. The vacuum is released and the temperature is set for about 70° C. A sample of the resin mixture is then taken through a port in the mixer and the sample heated to drive off the solvent. If the heating reveals that the sample had more than 3% volatiles by weight, the vacuum and heating is again applied to the resin mixture in the vacuum mixer. If there is less than a 3% weight difference between the sample of the resin mixture and its heated (i.e. devolatilized) product, then the remainder of the diglycidyl ether of Bisphenol F (10.5 parts) is added to the vacuum mixer. Mixing is continued while the resin mixture is cooled. When the mixture reaches 98° C., the 3,3'-bis(aminophenol)sulfone (12.86 parts) is added through a port in the mixer. After the powdery 3,3-bis(aminophenol) sulfone is fully dispersed, the mixer is raised and the walls scraped down. The temperature is set to 77° C., the mixer closed with mixing continued at full vacuum for about 15 minutes. The mixer is opened and the contents are poured into small containers which are stored at 0° C. for further processing of the epoxy resin composition thereof into prepreg.

The frozen epoxy resin composition of Part A is slowly brought to a temperature of about 50° C. The warmed epoxy resin composition comprises the uncured epoxy resin composition and distinct particles which contain the butadiene acrylonitrile polymer. The warmed epoxy resin composition containing the infusible particles is spread on a sheet of release paper. The sheet of release paper having the film of the epoxy resin composition is rolled up and stored at about 10° C. or below for further processing.

Tows of carbon fiber (IM-7 carbon fiber[1] available from Hercules Incorporated, Magna, Utah) are formed into a band. Two different bands are prepared. The first band has an areal weight (i.e. weight per unit area) of about 145 grams per square meter and the second band has an areal weight of about 190 grams per square meter. The first band is impregnated with the epoxy resin composition of this Example by passing it between a pair of rollers which press the band and upper and lower filmed epoxy resin composition parts together as they pass between the rollers. The rollers are kept about 75° C. and the resultant prepreg is between about 33 and 37% by weight resin. Similarly, the second band is made into prepreg by pressing the second band of carbon fiber and a further amount of the filmed resin together between rollers kept at a temperature above 75° C. The resultant prepreg made from the 190 gm per square centimeters areal weight carbon fiber is between about 33 and 37% by weight resin.

Approximately 12,000 filaments per tow. Filament physical characteristics include filament diameter 5 microns; round cross section. The modulus of the carbon fiber is about 44 million psi and the tensile strength about 750 thousand psi, these modulus and strength values measured using tow tests.

In an alternate procedure (hot bead) the epoxy resin is heated to about 75° C. and spread on a sheet of release paper. The tows of carbon fiber are then pressed into the molten resin carried on the release paper in making the prepreg. The resultant prepreg has between about 33 and 37% by weight resin.

The prepreg, prepared as above, is made into rolls of prepreg in which the prepreg in each of the rolls is separated by a sheet of release paper.

Twenty five grams of epoxy resin compositions prepared using the procedures of part A of this Example 1 were placed in a two hundred fifty milliliter beaker and mixed with 100 milliliters of tetrahydrofuran (THF) until the resin composition in which the infusible particles were dispersed was dissolved. The dissolution product was then filtered through pre-weighed Whatman #41 filter paper. The beaker and stir bar were rinsed with the THF until the filter paper was white. The filter paper was allowed to air dry and then placed in an oven at 75° C. The filter paper was cooled to room temperature in a desicator and weighed. This procedure was repeated using different batches of the epoxy resin composition. The particles on the filter paper are found using these procedures to weigh in a range between 2 and 6% by weight of the respective epoxy resin compositions.

A series of composite test panels are made from prepregs prepared following the foregoing procedures. The prepregs were layed up and cured and the cured composite panel tested to determine the post impact compression test values. The panels tested were 10 centimeters wide and 15 centimeters long. The panels were thirty two plies thick, each ply containing carbon fiber filaments extending in a single direction. The panels were quasi-isotropic according to the following scheme: $(+45°/90°/-45°/0°)_{4S}$. (The 4S in the lay-up means the lay-up had a total of thirty two (32) plies layed up as follows: a set of four plies was layed at the recited angles four times (i.e. sixteen plies in all) starting each time with a $+45°$ ply followed by laying a set of four plies four times in reverse order (i.e. sixteen plies in all) starting each time with a 0° ply. The lay-up was cured at 177° C. for two hours. The cured panels were impacted with an impact energy of 1,500 inch—lbs/inch thickness while suspended over a 3×5 inch opening. The compressive strength of the impacted panels was determined using the test procedure of NASA publication 1092, modified as above. Portions of the impacted panels were examined microscopically for phase separation in the epoxy thermoset matrix. Also, the size of the rubbery particles in sections of the impacted samples were measured and counted. Table 3, below, shows the results of the post impact compression (PIC) test together with the results of the particle size measurements.

As can be seen from Table 3, the size and distribution of the rubber particles have a correlation with the post impact compression (PIC) test results; the larger particle distributions generally give higher post impact compression results. Also as is seen from Table 3, the cured laminates having high PIC values exhibit a "phase separation." By "phase separation" is meant that there exists distinct epoxy phases in addition to the rubbery or other particulate phase.

TABLE 3

| | | MICROSCOPIC EXAMINATION | | | | |
|---|---|---|---|---|---|---|
| | | Crosslinked Epoxy Matrix Phase | Infusible Rubber Particle Phase | Particle Size | | |
| Panel No. | PIC (ksi) | Description | Description | Small ( ) | Large ( ) | Mean ( ) |
| 39652 | 43.5 | N.P.* | Spherical | 2.5 | 15.0 | |
| 37009 | 54 | S.P.** | Spherical | 10 | 58 | |
| 39668 | 38.3 | N.P. | Spherical | 1.25 | 10 | |
| 39669 | 42.6 | N.P. | Spherical | 1.25 | 10 | |
| 39558 | 48.5 | S.P. | Spherical | 4 | 25 | |
| 39718 | 39 | S.P.**** | Irregular | 1.25 | 10 | |
| 39737 | 41.5 | N.P. | Irregular | 0.6 | 7.5 | |
| 39735 | 43.4 | N.P. | Irregular | 0.6 | 7.5 | 5.6 |
| 39713 | 41.5 | N.P. | Roundish*** | 1.25 | 7.5 | |
| 39865 | 45.7 | S.P. | Spherical | 2.5 | 55 | |
| 39867 | 51.3 | S.P. | Spherical | 5 | 35 | |
| 39868 | 46.8 | S.P. | Irregular | 2.5 | 20 | |
| 39869 | 46.7 | S.P. | Irregular | 1.25 | 25 | |
| 39870 | 49.4 | S.P. | Roundish | 1.25 | 15 | |
| 39875 | 52.1 | S.P. | Spherical | 5 | 45 | |
| 39876 | 52.2 | S.P. | Spherical | 10 | 52.5 | 24.7 |
| 39877 | 51.5 | S.P. | Spherical | 7.5 | 65 | |
| 40034-1 | 43.0 | S.P. | Irregular | 1.0 | 55 | 12.2 |
| 40034-3 | 52.9 | S.P. | Irregular | 2.5 | 72.5 | 17.2 |
| 40023-1 | 50.5 | S.P. | Spherical | 5.0 | 77.5 | 16.5 |
| 40024-1 | 50.5 | S.P. | Roundish | 2.5 | 50 | 20.3 |
| 40028-2 | 52.5 | S.P. | Roundish | 5.0 | 45 | 15.4 |
| 40028-3 | 42.7 | S.P. | Roundish | 2.5 | 52.5 | 14.9 |
| 40029-1 | 50.4 | S.P. | Roundish | 5.0 | 35 | 13.4 |

*N.P. means a distinct phase separation not detected. (Not epoxy composites of this invention.)
**S.P. means phase separation detected.
***Roundish differs from spherical in that Roundish has a greater number of particles which were not entirely circular but elliptical or oblong like.
****This panel had a different lay up than the rest of the panels, it contains only 24 plys.

EXAMPLE 2

This example describes a laboratory preparation of an epoxy resin composition of this invention which does not require solvent removal after addition of the polyarylene polyether sulfone. An initial step in this preparation was forming a solution of carboxy-functional butadiene acrylonitrile polymer[1] and methylethylketone at 20% by weight of the polymer. Four hundred parts of this solution were mixed with 500 parts of diycidyl ether of Bisphenol F[2] at room temperature. The mixture was stripped of methylethylketone until its volatile content was below 2% by weight. Another step in this procedure began with heating 500 parts of triglycidyl aminophenol[3] to 60° C. in a separate vessel. Then, 520 parts of amine functional polyarylene polyether sulfone[4] were added slowly to the triglycidyl aminophenol with mixing and the temperature increased to 107° C. Mixing continued until the polyether sulfone dissolved. Five hundred eighty parts of the mixture of carboxy functional butadiene nitrile polymer and diglycidyl ether of Bisphenol F (less than 2% by weight volatiles) were heated to 100° C. in an oven and added at 110° C. to the solution of triglycidyl aminophenol and polyether sulfone to provide a reaction mixture that is held at about 107° C. for forty-five minutes. Antioxidant[5] (4 parts) and catalyst[6] (1.4 parts) were then added to the reaction mixture. The temperature of the reaction mixture was then cooled to 80° C. and 490 parts of 3,3'diaminodiphenylsulfone[7] added and dispersed into the mixture.

A prepreg was made from the epoxy resin composition prepared as shown above in Part A. The high strength filaments used in preparing this prepreg were tows of IM-7 carbon fiber[8] of Hercules Incorporated. The prepreg had a fiber volume of 55%. The prepreg was made into panels using the lay-up procedures of Example 1. The panels were tested also using the procedures of Example 1 and determined to have the following compressive strengths at 1500 inch pounds per inch thickness impacts: 50.6 thousand pounds per square inch; 52.9 thousand pounds per square inch and 51.1 thousand pounds per square inch. Also, neat resin samples were examined microscopically and found to have spherical particles comprising the butadiene acrylonitrile polymer ranging in size between 2.4 microns and 81.4 microns, which were generally spherical in shape. The median size of the particles was judged to be much greater than 10 microns.

1. 2, 3, 4, 5, 6, 7 and 8—See Example 1 for source and fuller description.

EXAMPLE 3

This Example illustrates use of epoxy resin compositions in making single tows of carbon fiber impregnated with resin. The carbon fiber used in making the tow-preg was IM-7 carbon fiber available from Hercules Incorporated. Tows of this carbon fiber have approximately 12,000 filaments and no twist. The cross sectional area of the tow is about 0.25 millimeter with each filament having a diameter of 5 microns and a smooth, round cross-section.

An epoxy resin composition prepared according to the procedures of Example is admixed with three levels of methylethylketone as shown in Table 4. The resin solutions were placed in resin coating baths which were agitated during passage of tows of the IM-7 carbon fiber through the bath. The tows were passed through the bath under a roller fixed in the bath and then out of the bath to an "S-bar" apparatus. The tow passed over a first bar and then under a second bar in traveling an S-shaped path. This path permitted wiping both sides of the tow-preg and was judged to give a uniform distribution of the particles of rubber polymer.

A stirring motor was used for take up of the tow-preg. A tow speed of about 4 feet per minutes was used. The pulley was high enough that a four-foot length of wet tow-prep could pull and cut off. This section was dried in air for about 10 minutes at room temperature and then in an oven at 93° C. for five minutes. This drying was determined to reduce volatiles to less than 3% by weight.

Volatiles content was determined by weighing a length of tow, drying it at 350° F. (133° C.) for 15 minutes and reweighing. Resin content was determined by extracting a weighed length of tow with tetrahydrofuran (THF), drying the extracted tow and reweighing. Insoluble rubber content was determined by filtering the THF extract through a weighed filter paper, drying and reweighing the filter paper. Distribution of rubber particles on the tow was determined by visual examination.

The following Table 4 provides information for three preparations of tow-preg prepared and tested as discussed above.

TABLE 4

| Des. | Resin Concentration | Volatiles Content (S.D.) | Resin Content (S.D.) | Rubber Content |
|---|---|---|---|---|
| 9493-12-1 | 50% | 3.0% (0.1) | 46.3% (1.05) | 3.3% |
| 9493-12-2 | 35% | 3.1% (0.5) | 34.4% (1.12) | 3.2% |
| 9493-12-3 | 30% | 3.2% (0.6) | 32.1% (1.34) | 2.8% |

EXAMPLE 4

A concentrate of particles comprising rubber polymer in an epoxy resin admixture is made as follows: Ten parts of diglycidyl ether of Bisphenol F (Epicon 830 from Dainippon Ink and Chemicals) and 10 parts triglycidyl p-aminophenol (CG 0510 from Ciba Geigy) were heated to 70° C. Twenty parts of amine functional polyarylene polyether sulfone were added to the epoxy resins and a slurry was formed. The slurry was heated to 105° C. and held for 40 minutes whereby the amine functional polyarylene polyether sulfone was dissolved. The product was then cooled to about 75° C. and fifteen parts of methyl ethyl ketone added. Then eight parts of carboxy functional butadiene acrylonitrile (Hycar 1472, B. F. Goodrich) rubber was added as a 15% by weight solution in methlyethylketone. The mixture was heated to about 107° C. while removing the methlethylketone and held at about 107° C. for fifteen minutes. The resultant epoxy resin concentrate was cooled to room temperature.

An initial step in formulating an epoxy resin composition of this invention from the concentrate of Part A, above, was forming a slurry of the triglycidyl p-aminophenol (40 parts), diglycidylether of Bisphenol F (40 parts) and amine functional polyarylene polyether (32 parts). The slurry was heated to 105° C. and held at that temperature for 40 minutes to dissolve the polyether sulfone and form a resin solution. The concentrate (48 Parts) at room temperature was combined with the resin solution held at 105° C. Then this combination was cooled to 70° C. and antioxidant (0.4 parts, Agerite Resin D, polymerized 1,2-dihydro-2,2,4-trimethyl quinoline, from R. T. Vanderbilt), catalyst (0.14 parts ethyltriphenyl phosphonium iodide from Morton-Thiokol and 3,3'-bis(aminophenyl) sulfone (49 parts, available from Example 1) were added and mixing continued for ten minutes to provide the epoxy resin composition.

EXAMPLE 5

In this example, a number of uncured epoxy resin compositions and cured epoxy resin compositions were analyzed relative particle size (Table 5) and viscosity (Table 6). The epoxy resin compositions were made generally according to the procedures of Example 1. The results reported in Table 5 were gathered by making a photomicrograph of the uncured resin composition and then using an image analyzer with a computerized "mouse" to determine particle size from the photomicrograph. The image analyzer was set to establish particle size within 10 micron increments.

TABLE 5
PARTICLE SIZE ANALYSIS UNCURED (NEAT) RESIN

| Lot | N[1] | Mean (microns) | Range (microns) | 10 (microns)[3] | 90-100 (microns)[4] |
|---|---|---|---|---|---|
| S005A | 51 | 51.7 | 10-90 | | |
| S005B | 66 | 46.8 | 10-100 | | 1 |
| S005C | 55 | 39.2 | 10-100 | | 1 |
| S005D | 55 | 48.9 | 10-90 | | |
| S005E | 74 | 47.8 | 10-90 | | |
| S005F | 65 | 47.2 | 1-100 | 2 | 1 |
| S005G | 40 | 67.0 | 20-100 | | 4 |
| S005H | 45 | 41.9 | 1-100 | 4 | 3 |
| S005I | 29 | 42.6 | 1-100 | 2 | 1 |
| S005J | 47 | 46.7 | 1-100 | 1 | 2 |
| S005K | 78 | 36.0 | 1-100 | 4 | 2 |
| S005L | 124 | 33.2 | 1-100 | 10 | 5 |
| S005M | 99 | 35.7 | 10-90 | | |
| S005N | 76 | 38.5 | 10-70 | | |
| S005O | 77 | 38.1 | 1-80 | 3 | |
| S005P | 70 | 34.9 | 1-100 | 4 | 1 |
| S005S | 97 | 33.2 | 1-90 | 3 | |
| S005T | 88 | 38.0 | 10-70 | | |
| S005U | 66 | 36.7 | 1-90 | 4 | |
| S005X | 118 | 28.8 | 1-90 | 6 | |
| S005Q | 104 | 36.4 | N.D.[2] | N.D. | N.D. |
| S005R | 74 | 39.2 | N.D. | N.D. | N.D. |
| S005G | 89 | 44.3 | 10-100 | | 1 |
| S005W | 136 | 29.2 | 1-80 | 6 | |
| S005X | 78 | 37.4 | 1-80 | 1 | |
| S005Y | 109 | 35.2 | 1-80 | 5 | |
| S005Z | 175 | 24.6 | 1-80 | 22 | |
| S005AA | 119 | 34.9 | 1-100 | 17 | 2 |
| S005AB | 42 | 58.9 | 1-100 | 5 | 1 |
| S005AC | 49 | 47.2 | 1-100 | 7 | 1 |
| S005AD | 35 | 63.5 | 1-80 | 1 | |
| S005AE | 59 | 48.6 | 1-100 | 9 | 1 |
| S005AF | 50 | 42.5 | 1-100 | 10 | 1 |
| S005AG | 61 | 51.3 | 1-100 | 7 | 2 |
| S005AJ | 63 | 45.9 | N.D. | N.D. | N.D. |
| S005AI | 40 | 50.6 | 1-80 | 1 | |
| S005AK | 75 | 36.6 | 1-60 | 7 | |
| S005AL | 117 | 31.3 | 1-70 | 16 | |
| S005-S006 | 102 | 32.7 | 1-70 | 14 | |
| Average | 2997 | 38.7 | | 171 (6.20%) | 30 (1.09%) |

[1] N means number of particles counted.
[2] N.D. means not determined.
[3] Number in 10 micron range.
[4] Number in 90-100 micron range.

Table 6 shows melt flow rhelogy on eleven batches of resin compositions made according to Example 1. Table 7 shows the initial viscosity at 60° C. for these samples, the minimum viscosity, the temperature at which the minimum viscosity occurs, the dynamic gel temperature (DGT) and heating rate. All scans reported in Table 6 were run at similar conditions of 50 mm diameter parallel plates, 0.5 mm gap, 10 radians/second frequency, 50% strain and cure mode. The temperatures at which minimum viscosity and DGT occur at fairly constant while the viscosities are scattered but not out of line with other resin systems. The DGT for the epoxy resin compositions was determined to be about 156° C. when heating at 0.851° C./minute; 176° C. when heating at 1.857° C./minute; 186° c. when heating at 2.897° C./minute and 199° C. when heating at 4.273° C./minute.

TABLE 6
RESIN VISCOSITY

| Resin | Initial 60° C. n* (poise) | Minimum Viscosity n* (poise) | Temp. (°C.) | DGT (°C.) | Heating Rate (°C./min) |
|---|---|---|---|---|---|
| | 4505 | 21.1 | 137 | 174 | 1.921 |
| SX005C | 3510 | 15.1 | 142 | 175 | 1.937 |
| SX005F | 3215 | 13.3 | 137 | 174 | 1.889 |
| SX005G | 3605 | 11.6 | 144 | 176 | 1.729 |
| SX005I | 4955 | 33.7 | 135 | 175 | 1.765 |
| SX005K | 7585 | 22.8 | 145 | 173 | 1.691 |
| SX005M | 6965 | 20.0 | 143 | 176 | 1.857 |
| SX005P | 4670 | 10.0 | 143 | 176 | 1.933 |
| SX005S | 6780 | 20.0 | 149 | 177 | 2.035 |
| SX006A | 5565 | 16.4 | 143 | 175 | 1.828 |
| SX006C | 6035 | 22.6 | 141 | 174 | 1.917 |
| X (n = 11) | 5217 | 18.8 | 142 | 175 | 1.864 |
| | 1493 | 6.6 | 4 | 1 | 0.103 |
| Cv (%) | 28.62 | 35.27 | 2.86 | 0.68 | 5.51 |

Table 7 shows the glass transitions of thirteen coupons made from an epoxy resin composition prepared as in Example 1. The existence of more than one glass transition temperature in these samples as shown in Table 7 indicates the presence of more than one crosslinked epoxy phase.

TABLE 7
COMPOSITE Tg

| Panel No. | Lot No. | TG' (°C.) | Tg #1 (°C.) | Tg #2 (°C.) |
|---|---|---|---|---|
| 40025 | 3-8318 | 161 | 181 | 203 |
| 40026 | 3-8319 | 162 | 181 | 202 |
| 40027 | 3-8322 | 164 | 181 | 203 |
| 40030 | 3-8321 | 161 | 181 | 202 |
| 40033 | 3-8323 | 164 | 181 | 207 |
| 40034 | 3-8323 | 160 | 180 | 197 |
| 40087 | 3-8342 | 154 | 173 | 195 |
| 40118 | 3-8349 | 159 | 181 | 193 |
| 40137 | 3-8353 | 160 | 181 | 203 |
| 40220 | 3912-2 | 161 | 185 | 199 |
| 40328 | 3-8390 | 135 | 158 | 178 |
| 40337 | 3-8391 | 160 | 180 | 200 |
| 40341 | 3-8395 | 160 | 178 | 201 |
| X (n = 13) | | 159 | 179 | 199 |
| | | 8 | 7 | 7 |
| Cv (%) | | 4.72 | 3.76 | 3.65 |

EXAMPLE 6

In this Example, particle sizes of uncured epoxy resin compositions (prepared according to Example 1) compositions are compared with the particle size and post impact compression values obtained from prepregs layed-up and cured using the procedures of Example 1.

The uncured epoxy resin compositions were analyzed as follows: A one half gram (approximate) sample was taken from each batch of the epoxy resin compositions and placed on a glass slide. The slides were then each heated on a hot plate having a temperature setting of 118° C. The resin sample was then smeared into a thin film across the slide and allowed to further heat at 118° C. for five (5) minutes. The sample slide was then cooled and examined on a polarizing microscope equipped with a transmitting light source and a Polaroid camera. A photomicrograph was taken of the sample at a magnification of 156×.

The photomicrograph was visually examined and those samples having at least about 75% of the particles which were round and non-agglomerated were selected for further processing.

The photomicrographs were then further evaluated on an image analyzer set at 10 micron steps. A computerized "mouse" was used in measuring the long axis of each particle. When all particles in the sample were measured, the computer was used to generate a histogram and print out the number of particles counted, the median particle size, the range and the standard deviation.

The size of the particles in the cured composites were determined similarly. The particles measured in the cured composites were those in the boundary (essentially fiber fill) of resin between the plies of cured resin. The lay-up was the same as in Example 1 except for sample D shown in Table 8 below. Sample D had the lay-up [45/0/-45/90]$_{3S}$ which gives a 24 ply laminate. As can be seen from Table 8 the particles remain about the same size during processing of the epoxy resin compositions into cured composites.

TABLE 8

|   | Composite Median Particle Diameter (Microns) | Neat Resin Median Particle Diameter (Microns) | Post Impact Compression (PIC) | Resin Lot Nos. |
|---|---|---|---|---|
| A | 31 | 33 | 50.5 | XS005 L |
| B | 34.2 | 36 | 50.0 | XS005 K |
| C | 35.3 | 36 | 52.5 | XS005 M |
| D | 39.9 | 36 | 48.5 | XS005 M |
| E | 30.8 | 29 | 54.4 | XS005 V |
| F | 37.9 | 35 | 50.6 | XS005 AA |
| G | 36.8 | 35 | 50.0 | XS005 Y |
| H | 41.4 | 47 | 52.8 | XS005 AC |
| I | 41.1 | 42 | 54.1 | XS005 AF |
| J | 32.8 | 31 | 51.7 | XS005 AL |

EXAMPLE 7

In this Example, epoxy resin compositions are made on a larger than laboratory scale using the procedures of Example 2 except for the following. The dissolution product of amine functional polyether sulfone and triglycidyl aminophenol was cooled to 90° C. and the mixture of carboxy functional butadiene nitrile polymer and diglycidyl ether of Bisphenol F was added at 55° C. thereto.

A series of prepregs were made from these epoxy resin compositions. The prepregs were made by first making a film of the resin. The highest temperature used in making the film was about 70° C. The prepregs were made by pressing either 145 grams per meter areal weight IM-7 carbon fiber or 190 grams per meter areal weight IM-7carbon fiber into the film. The resulting prepregs were about 35% (Grade 145) or 42% (Grade 190) by weight resin. Portions of the prepreg on each spool were layed up, cured and tested according to the procedures of Example 1. The particle size in the boundary resin layer (between plies) in the cured laminate was determined to the extent of determining dimensions of the largest and smallest particles thereof. In addition, the shape of the particles in each cured sample was judged visually. The results of this testing are shown below in Table 9A. These results show that more dense layers of fiber (i.e. areal weight 190 grams per centimeter) can be used to filter particles from the epoxy resin compositions. This filtration causes these larger particles to lie on the surface of the prepreg and thereafter reside in the boundary resin layer that is between plies (layers) of filaments. Presence of these larger particles between plies of filaments provides, as can be seen from the results in Table 9A, greater post impact compressive strength to the resulting composites.

TABLE 9

| | GRADE 190[1] | | | |
|---|---|---|---|---|
| SPOOL | PIC (KSI) | PARTICLE SHAPE | PARTICLE SIZE SMALLEST | LARGEST |
| 1 | 48.5 | SPHERICAL | 4 | 25 |
| 3 | 46.8 | IRREGULAR | 2.5 | 20 |
| 4 | 46.7 | IRREGULAR | 1.25 | 25 |
| 5 | 49.4 | IRREGULAR | 1.25 | 15 |
| 6 | 45.7 | ROUND | 2.5 | 55 |
| 7 | 51.3 | ROUND | 5 | 35 |

| | GRADE 145[2] | | | |
|---|---|---|---|---|
| RUN # | PIC (KSI) | PARTICLE SHAPE | PARTICLE SIZE[3] SMALLEST | LARGEST |
| 3-8522 | 38.3 | SMALL SPHERICAL | 1.25 | 10 |
| 3-8210 | 42.6 | SMALL SPHERICAL | 1.25 | 10 |
| 3-8230 | 41.1 | SMALL SPHERICAL | 1.25 | 7.5 |
| 3-8232 | 43.4 | NOT SPHERICAL | 0.6 | 7.5 |
| 3-8237 | 41.5 | NOT SPHERICAL | 1.25 | 10 |

[1]IM-7 carbon fiber having an areal weight of 190 grams per square meter.
[2]IM-7 carbon fiber having an areal weight of 145 grams per square meter.
[3]Microns.

The procedures of this Example were repeated except that the epoxy resin composition was made according to the procedures of Example 1. The average particle was determined from the neat epoxy resin composition using the procedures of Example 5. Table 9B sets forth the results.

TABLE 9B

| Prepreg Run No. | Spool No. | Areal Weight (gm/m$^2$) | Particle Size[3] | PIC (ksi) |
|---|---|---|---|---|
| X3995-4 | 2X | 190 | 33 | 51.4 |
| X3987-4 | 2A | 190 | 35 | 49.6 |
| X3995-4 | 7A | 145 | 33 | 48.3 |
| X4048-4 | 3B | 145 | 36 | 48.6 |
| X3997-4 | 2B | 135 | 34 | 48.1 |
| X3997-4 | 18B | 135 | 31 | 43.8 |

Table 9B illustrates that the particle size of the neat resin is generally associated with high toughness levels.

EXAMPLE 8

An epoxy resin composition like that described in Example 1 is prepared using a different reactive aromatic oligomer. This different reactive aromatic oligomer is made by replacing an amount of the bisphenol A used in manufacture of the oligomer with sodium sulfide to yield an amine functional polyarylene polyethersulfone polythioethersulfone (see formula I in the Specification). The level of the ingredients in the epoxy resin composition was the same as in Table 1 and the mixing procedure of Example 1 followed.

Figure 1:
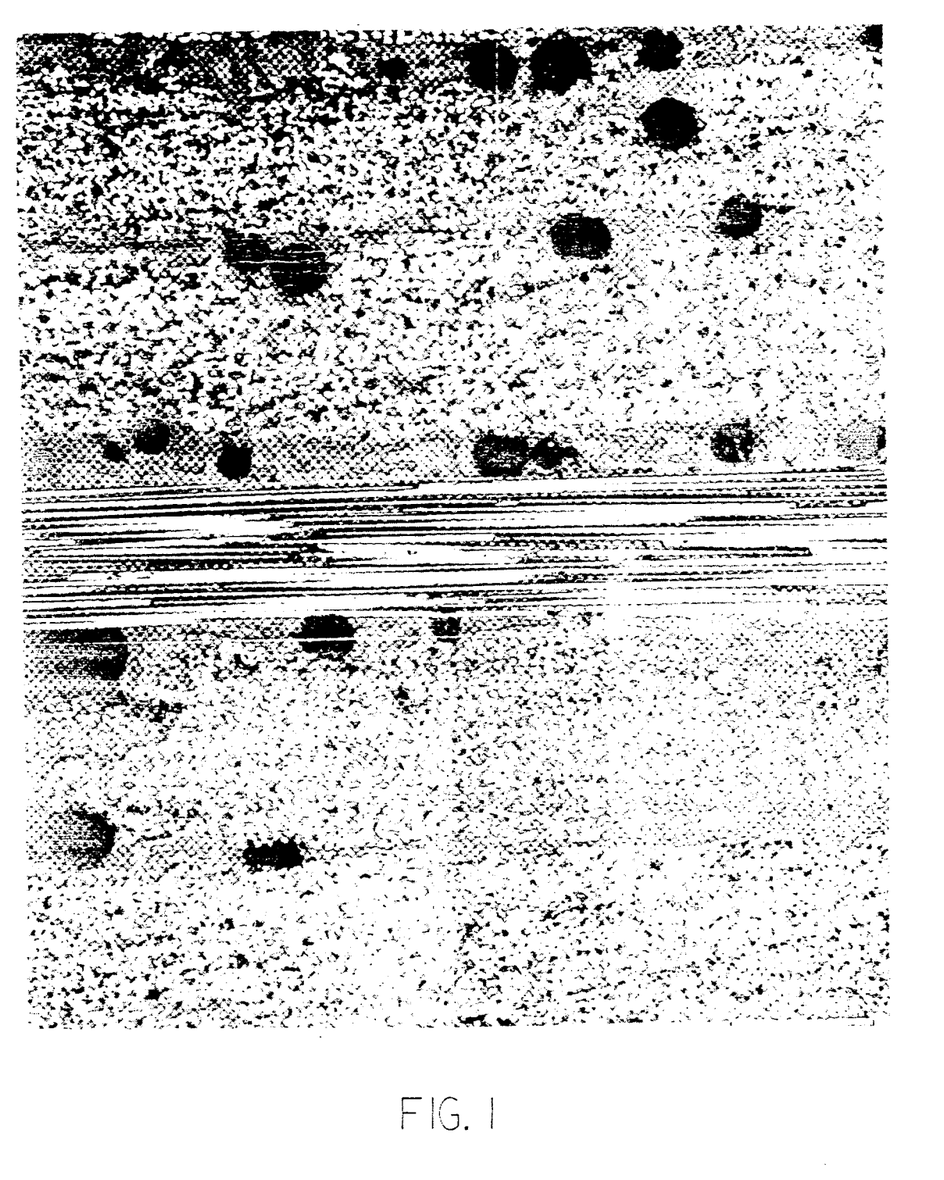
Figure 2A:
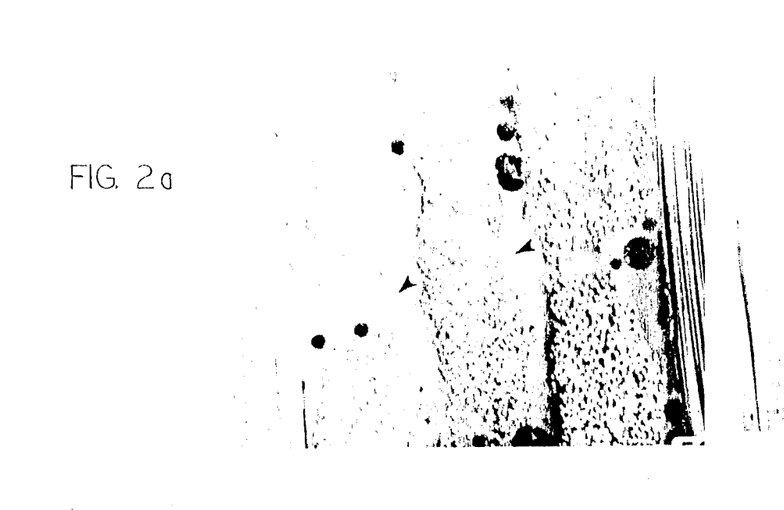
FIG. 2 shows other micrographs of the damage tolerant composite like that of FIG. 1 [FIGS. 2(a) and 2(b)] together with a crosslinked epoxy resin cured without fiber [FIGS. 2(c) and 2(d)]. The crosslinked epoxy resin of FIGS. 2(c) and 2(d) is made with the same formulation of the composite of FIGS. 1, 2(a) and 2(b). The cured resin of FIG. 2(a), (b) and (c) has been washed with methylene chloride ($CH_2Cl_2$) to improve phase contrast.
Figure 2B:
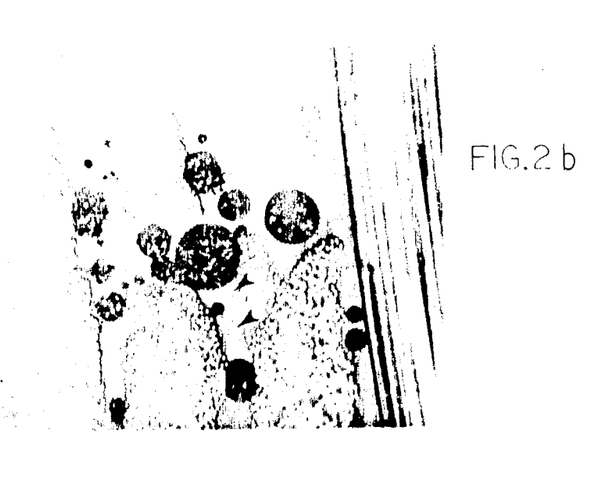
Figure 2C:
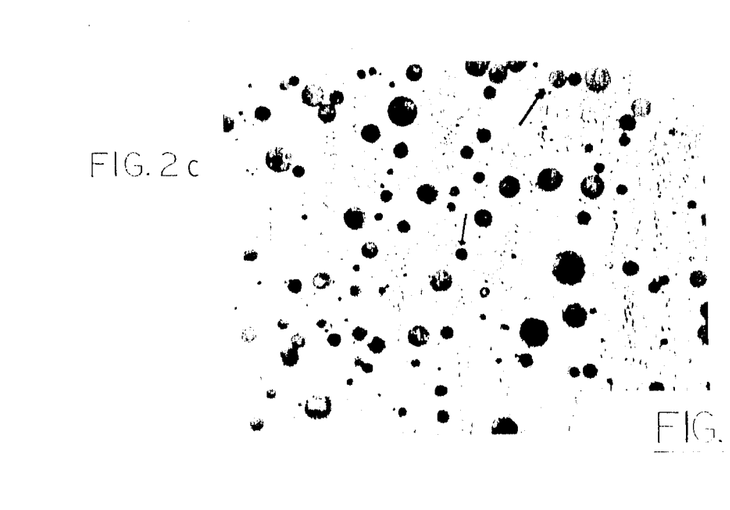
Figure 2D:
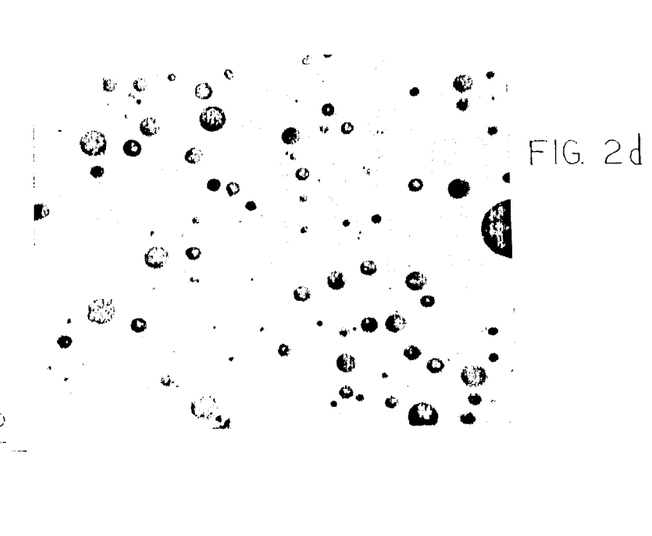
Figure 3A:
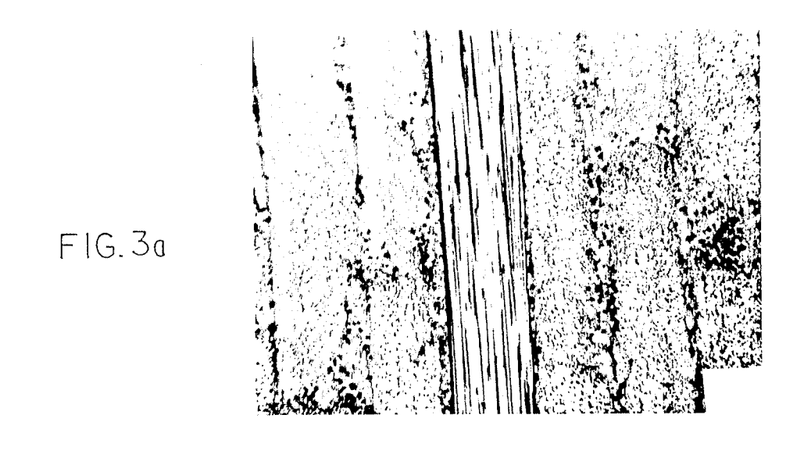
FIGS. 3, 4 and 5 respectively show photomicrographs of three damage tolerant composites. The composites were made using the same nominal formulation. The composite of FIGS. 3(a), (b) and (c) had a post impact compressive strength (PIC) of 48.5. The composite of FIG. 4 had a post impact compressive (PIC) strength of 43.5. The PIC strength of the composites of FIG. 5 was 38.3.
Figure 3B:
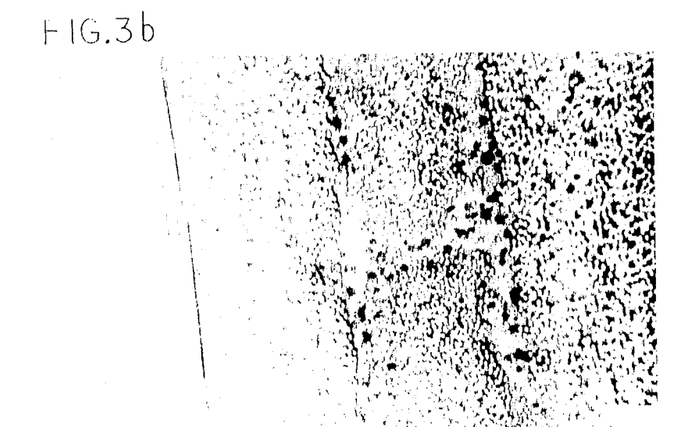
Figure 3C:
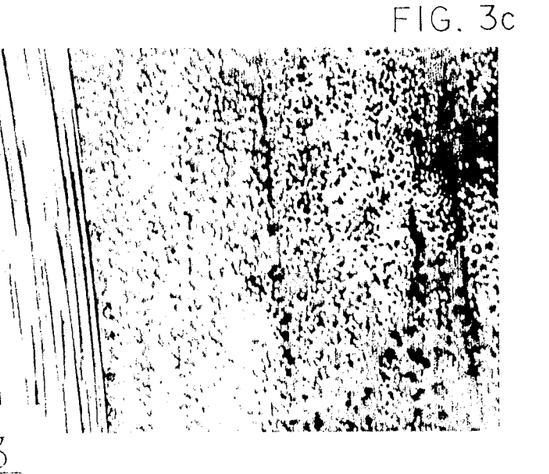
Figure 4A:
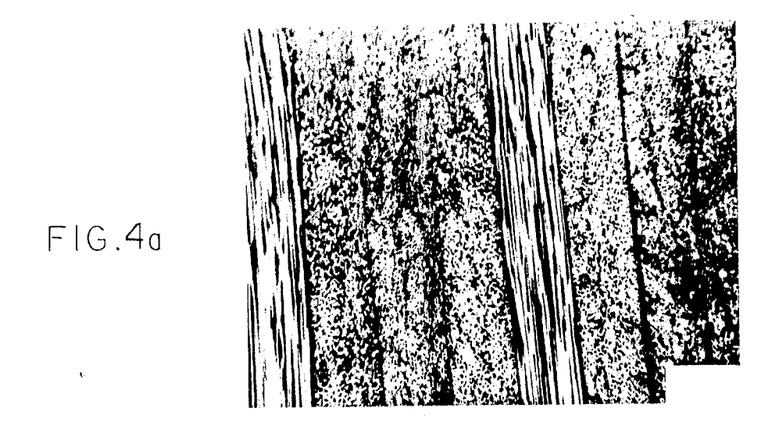
Figure 4B:
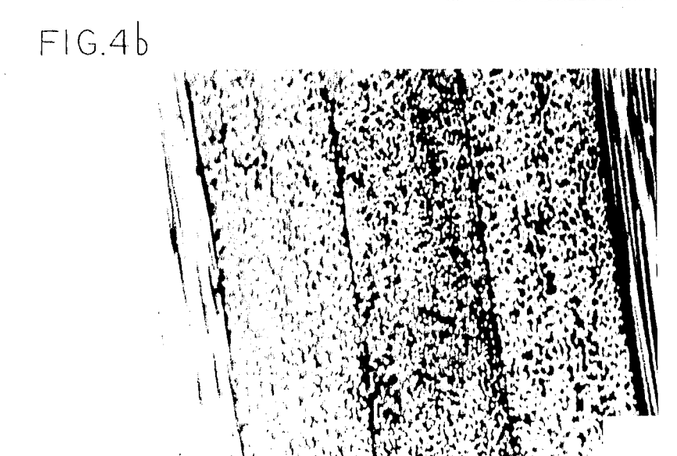
Figure 4C:
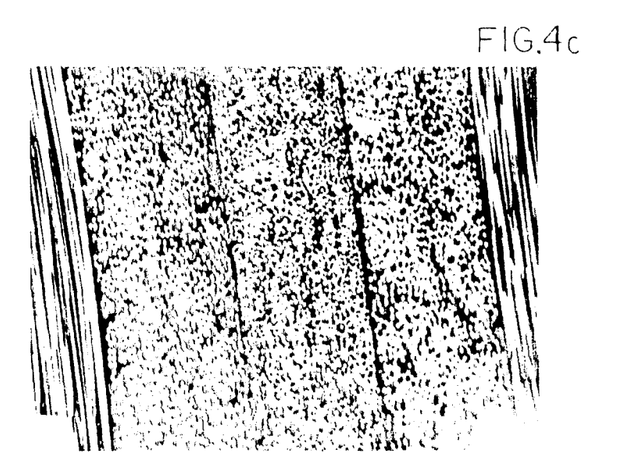
Figure 5A:
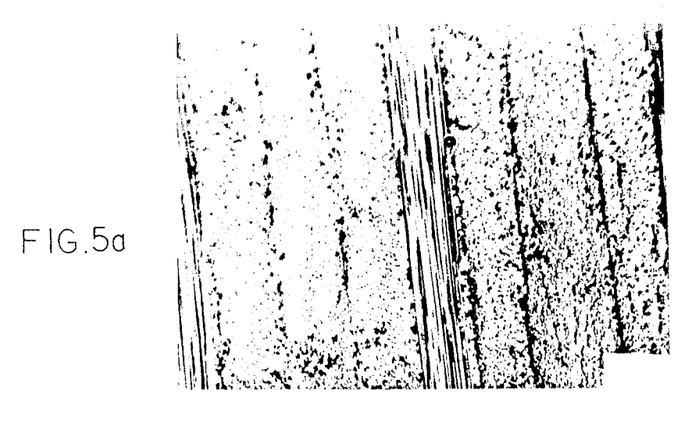
Figure 5B:
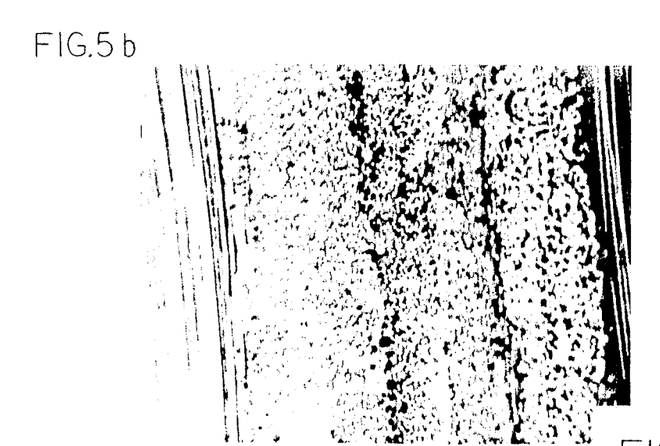
Figure 5C:
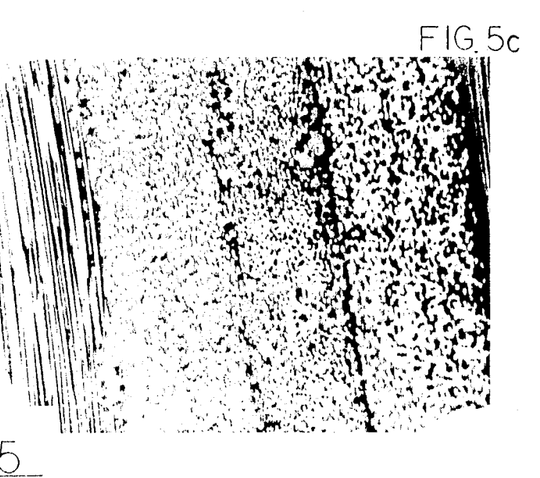
Figures 6, 6A, 6B:
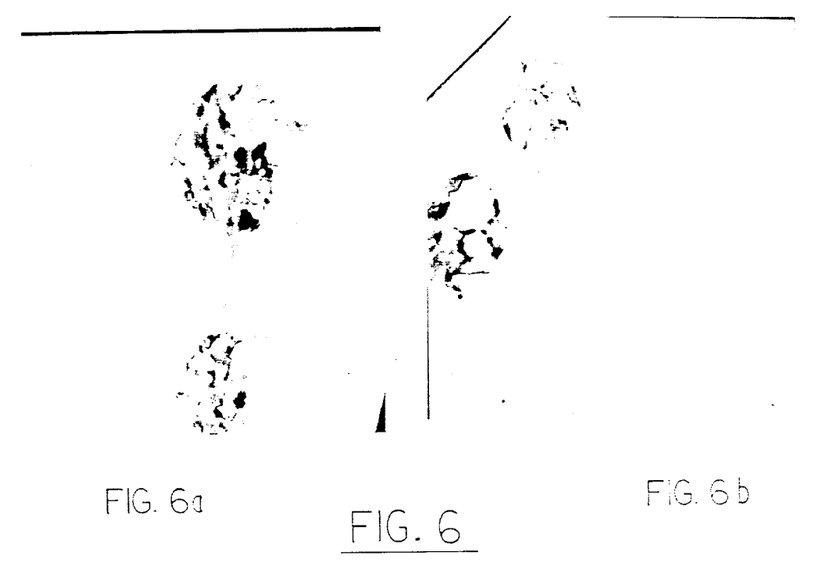
FIG. 6 shows a photomicrograph of a cured epoxy resin wherein the resin formulation includes an oligomer which is different from those of FIGS. 1-5.

Photomicrographs of the cured epoxy resin composition are taken and copies thereof are shown in FIG. 6.

The large, darker circles are the infusible particles of rubber polymer. (A portion of certain of the infusible particles has been cut away during sample preparation.) The other portions of the crosslinked epoxy resin matrix exhibit phase separation yielding glassy crosslinked phases.

EXAMPLE 9

In this example, an epoxy resin composition made using the procedures of Example 1 was made into a prepreg using IM-7 carbon fibers of Hercules Incorporated. The prepreg was layed up and cured into composite test samples. The samples were tested to determine various mechanical properties as compared to composites made using the thermoplastic resin APC-2 and AS-4 carbon fibers available from Hercules Incorporated (Column 8). The results are reported in Table 10 below, the data in Table 10 being normalized to 57% fiber volume.

TABLE 10
MECHANICAL DATA SUMMARY

| Property | A<br>IM7<br>X* | B<br>AS4<br>X* |
|---|---|---|
| RT** Tensile Strength (ksi) | 400 | 315 |
| RT Tensile Modulus (Msi) | 23.00 | 21.0 |
| 0° Compression Strength (ksi) | | |
| RT | 235 | 230 |
| 180° F. | 200 | 205 |
| 180° F. - Wet | 160 | 170 |
| 200° F. | 185 | 180 |
| 200° F. - Wet | 180 | |
| Short Beam Shear (ksi) | | |
| RT | 14.5 | 15.5 |
| 180° F. | 11.5 | 12.3 |
| 180° F. - Wet | 10.0 | 12.4 |
| 250° F. | 10.0 | 9.5 |
| 250° F. - Wet | 8.2 | 7.3 |
| Open Hole Tensile (ksi) | | |
| RT | 75 | 60 |
| 180° F. | 69 | |
| Open Hole Compression (ksi) | | |
| RT | 42 | 44 |
| 180° F. | 37 | 38 |
| 180° F. - Wet | 36 | |
| CAI*** (ksi) | 50 | 44 |

*Average value normalized 60% Fiber Volume.
**RT = room temperature.
***Compression After Impact 6.67 J/MM Impact Level.

Table 11, set forth below, shows exemplary properties of a composite of this invention (column A), a composite made from a standard commercially available epoxy resin (column B) and a composite made using the thermoplastic APC-2 (column C). The data in column A of Table 11 represents values obtained from the composites of this invention where the epoxy resin composition is made using procedures generally described in Example 1.

TABLE 11

| Processing | A<br>350° F. Cure | B<br>350° F. Cure | C<br>720° F.<br>Molding |
|---|---|---|---|
| $T_G'$ (°C.) Wet/Dry | | 120/163 | 130/187 |
| $G_{1C}$ in-lb/in² (composite) | 2.6 | 1.12 | 13.7 |
| Gel Times (minutes at 350° F.) | 8–15 | 6–12 | — |
| Minimum Viscosity (poise)¹ | 15 (139° C.) | 6–10 (114° C.) | — |
| Dynamic Gel Temperature (°F.)* | 340 (171° C.) | 347 (175° C.) | — |
| Post Impact Compression (ksi) at 1500 in-lb/in thicknesses | 53² | 22 | 45 |
| Absorbed Moisture (%) | 1.3 | 1.3 | 0.2 |

¹Varies upon heating rate (these tested at 2° F./min.).
²IM-7 carbon fiber.

EXAMPLE 10

A number of epoxy resin compositions were made and various infusible particles mixed into the compositions. The SBR, EPDM, natural and silicone rubber particles were made by cryogenically freezing the rubber, grinding and then seiving to desired particle size. The epoxy resin compositions were formulated to provide an equal approximate volume of particles and then used to make prepregs containing carbon fiber in the form of a plurality of tows each comprising a multitude of filaments. The prepregs were layed up and cured in the manner described in Part C of Example 1. The cured samples were then tested with the results shown in Table 12 below. The thermosets all exhibited phase separated behavior.

TABLE 12

| Ingredient | 69-1 | 69-2 | 69-3 | 71-1 | 71-2 | 71-3 | 71-4 | 73-1 | 73-2 |
|---|---|---|---|---|---|---|---|---|---|
| Diglycidyl ether of Bisphenol F¹ | 50 | 50 | 50 | 50 | 50 | 50 | 50 | 50 | 50 |
| Triglycidyl p-amino phenol² | 50 | 50 | 50 | 50 | 50 | 50 | 50 | 50 | 50 |
| Amine functional polyarylene polyether sulfone³ | 52 | 52 | 52 | 52 | 52 | 52 | 52 | 52 | 52 |
| 3,3'-Bis(aminophenyl) sulfone⁴ | 49 | 45.5 | 49 | 49 | 49 | 49 | 49 | 49 | 49 |
| X26431-SBR⁵ Rubber | — | — | 8 | — | — | — | — | — | — |
| X26431-EPDM⁶ Rubber | — | — | — | 8 | — | — | — | — | — |
| X26431-NAT⁷ Rubber | — | — | — | — | 8 | — | — | — | — |
| X26431-SIR⁸ Rubber | — | — | — | — | — | 8 | — | — | — |
| PFA 20/40 Silica/ [Alumina 20-40⁹ | — | — | — | — | — | — | 16 | — | — |
| Q-CEL 120 Glass [5-150¹⁰ | — | — | — | — | — | — | — | 4 | — |
| Miralite 177 [PVDC 30-40¹¹ | — | — | — | — | — | — | — | — | 3 |
| Composite Run # | 3-8958 | 3-8959 | 3-8968 | 3-8972 | 3-8971 | 3-8967 | 3-8966 | 3-8960 | 3-8965 |
| DMS¹² | | | | | | | | | |

TABLE 12-continued

| Ingredient | 69-1 | 69-2 | 69-3 | 71-1 | 71-2 | 71-3 | 71-4 | 73-1 | 73-2 |
|---|---|---|---|---|---|---|---|---|---|
| Tg, dry °C. | 183 | | 183 | 183 | 180 | 181 | 179 | | 179 |
| TΔg, dry °C. | 162 | | 162 | 160 | 162 | 161 | 164 | | 160 |
| Tg, wet °C. | 159 | | 163 | 162 | 164 | 161 | 163 | | 161 |
| TΔg, wet °C. | 123 | | 126 | 121 | 122 | 120 | 124 | | 122 |
| 0° compression panel # | 43594 | 43621 | 43481 | 43471 | 43475 | 43478 | 43473 | 43623 | 43477 |
| RT dry, ksi | | 234 | 228 | 222 | 205 | 188 | 214 | 211 | 226 |
| 180° F. dry, ksi | 214 | 214 | 175 | 193 | 171.6 | 189 | 184 | 190 | 220 |
| 180° F. wet, ksi | 206 | 183 | 170 | 160 | 156 | 158 | 195 | 161 | |
| Thickness/ply | .0057 | .0057 | .0058 | .0058 | .0058 | .0057 | .0057 | .0058 | .0058 |
| CAI (1500 in. lbs/in. thick) panel # | 43595 | 43622 | 45480 | 43470 | 43474 | 43479 | 43472 | 43624 | 43476 |
| Str individuals, ksi | 33.8, 40.9 35.3 | 38.2, 36.1 37.5 | 38.2, 42.6 42.1 | 43.3, 42.9 45.6 | 41.2, 42.0 38.9 | 38.5, 38.6 39.6 | 47.3, 43.0 49.2 | 42.1, 45.4 45.9 | 38.1, 35.9 39.4 |
| Str average, ksi | 36.5 | 37.2 | 41.0 | 43.9 | 40.7 | 38.9 | 46.5 | 44.2 | 37.8 |
| Thickness, ply | .0058 | .0058 | .0057 | .0058 | .0059 | .0057 | .0058 | .0058 | .0058 |

1, 2, 3, 4 See Example 1.
5, 6, 7 and 8 Styrene butadiene rubber, ethylene propylene diene monomer rubber, natural rubber and silicone rubber, respectively, which was cryogenically ground into desired particle size.
9 Ceramic 20-40 microns in size from Fillite USA Incorporated.
10 PQ Corporation rhollow ceramic microspheres - 5-150 microns in size.
11 Polyvinyl dichloride from Pierce Stevens, Buffalo, NY.
12 Dynamic Mechanical Spectroscopy It is especially interesting to note that the interlaminer fracture $G_{10}$ energy is much higher for the thermoplastic resin as compared to the cured neat resin of this invention but that the damage tolerance of the composites of this invention are at least comparable to (if not higher than) the damage tolerance of the thermoplastic composite.

We claim:

1. An epoxy resin composition comprising a polyepoxide component, a reactive oligomer, a curing agent and infusible particulate, said resin composition exhibiting phase separation upon cure into crosslinked glassy phases and made by a process comprising combining:
   100 parts by weight of a polyepoxide component comprising a polyepoxide compound having a glass transition below 50° C. and having at least about two epoxide groups per molecule;
   between about 10 and 200 parts by weight of a reactive oligomer component comprising a crosslinkable oligomer having at least about two crosslinkable groups per molecule and a molecular weight (number average) between about 2000 and 10,000;
   between about 5 and 100 parts by weight of a curing agent for crosslinking said epoxy composition and having a molecular weight below about 1000; and
   between about 1 and 16% by weight of said epoxy resin composition of infusible particles comprising a rubber polymer wherein said rubber polymer is not crosslinkable in said epoxy resin composition, an amount of said polymer being contained within said infusible particles that are dispersed throughout said resin composition and have a lower modulus than the matrix of said epoxy resin composition that is cured in absence of said infusible particles.

2. The epoxy resin composition in accordance with claim 1, wherein said particles are made using a cryogenically ground rubber polymer.

3. An epoxy resin composition comprising a polyepoxide component, a reactive oligomer, a curing agent and infusible particulate, said resin composition exhibiting phase separation upon cure into crosslinked glassy phases and made by a process comprising combining:
   100 parts by weight of polyepoxide component comprising a polyepoxide compound having a glass transition below 50° C. and having at least about two epoxide groups per molecule;
   between about 10 and 200 parts by weight of a reactive oligomer component comprising a crosslinkable oligomer having at least about two crosslinkable groups per molecule and a molecular weight (number average) between about 2000 and 10,000;
   between about 5 and 100 parts by weight of a curing agent for crosslinking said epoxy composition and having a molecular weight below about 1000; and
   between about 1 and 16% by weight of said epoxy resin composition of infusible particles of inorganic particulate that is inert relative to said cured epoxy resin composition and having a median size between 10 and 75 microns.

4. The epoxy resin composition in accordance with claim 3, wherein said reactive oligomer is an amine functional polyarylene polyether sulfone or ketone, an amine functional polyarylene polythioether sulfone or ketone or combinations thereof.

5. The epoxy resin composition in accordance with claim 4, wherein said curing agent comprises an amine functional sulfone.

* * * * *

UNITED STATES PATENT AND TRADEMARK OFFICE
CERTIFICATE OF CORRECTION

PATENT NO. : 5,025,045
DATED : June 18, 1991
INVENTOR(S) : I. Gawin and B. J. Swetlin It is certified that error appears in the above-identified patent and that said Letters Patent is hereby corrected as shown below:

Col. 1, line 6, "07/137,845, filed December 24, 1982," should read --07/137,846 filed December 24, 1987,--;

Col. 4, lines 35-36, "4,4' dichlorores diphenylsulfone" should read --4,4' dichlorodiphenylsulfone--;

Col. 18, line 8, "186° c." should read --186° C.--; and

Col. 21, line 17, "(Column 8)" should read --(Column B)--.

Signed and Sealed this

Twenty-sixth Day of January, 1993

Attest:

STEPHEN G. KUNIN

*Attesting Officer*  *Acting Commissioner of Patents and Trademarks*